US012732563B2

(12) United States Patent
Simon

(10) Patent No.: US 12,732,563 B2
(45) **Date of Patent: *Sep. 8, 2026**

(54) CLOUD DEPLOYMENT OF NETWORK FUNCTION SOFTWARE WITH A MANAGEMENT MANIFEST

(71) Applicant: AT&T Intellectual Property I, L.P., Atlanta, GA (US)

(72) Inventor: Sean Simon, Lynnwood, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 45 days.

This patent is subject to a terminal disclaimer.

(21) Appl. No.: 19/007,704

(22) Filed: Jan. 2, 2025

(65) Prior Publication Data

US 2025/0141971 A1 May 1, 2025

Related U.S. Application Data

(63) Continuation of application No. 18/669,646, filed on May 21, 2024, now Pat. No. 12,219,025, which is a (Continued)

(51) Int. Cl.
*H04L 67/00* (2022.01)
*G06F 8/61* (2018.01)
*G06F 9/455* (2018.01)

(52) U.S. Cl.
CPC ................ *H04L 67/34* (2013.01); *G06F 8/61* (2013.01); *G06F 9/45558* (2013.01); *G06F 2009/45595* (2013.01)

(58) Field of Classification Search
CPC ................... G06F 8/61; G06F 9/45558; G06F 2009/45595; H04L 67/34
See application file for complete search history.

(56) References Cited

U.S. PATENT DOCUMENTS 10,979,248 B1 4/2021 Melkild
2002/0083165 A1 6/2002 Nagata
(Continued)

FOREIGN PATENT DOCUMENTS

WO WO-2022172060 A1 * 8/2022 ......... H04L 43/0817

OTHER PUBLICATIONS

"ETSI GS N FV-MAN 001 V1 .1.1 (2014-12)", Group Specification; Network Functions Virtualisation (N FV); u Management and Orchestration; Network Functions Virtualisation (NFV) ETSI Industry Specification Group (ISG), 2014, 184 pages.
(Continued)

*Primary Examiner* — Kostas J Katsikis
(74) *Attorney, Agent, or Firm* — Guntin & Gust, PLC; Kenneth S. Kwan

(57) ABSTRACT

Aspects of the subject disclosure may include, for example, generating a management manifest for a network function (NF) software application, wherein the NF software application is to be deployed in a cloud computing environment, based on the generating the management manifest, deriving a software package that includes the NF software application and the management manifest, and causing the software package to be outputted for deployment in the cloud computing environment, wherein inclusion of the management manifest with the NF software application in the software package facilitates utilization of the management manifest for monitoring and management of a system that results from deployment of the NF software application in the cloud computing environment. Other embodiments are disclosed.

20 Claims, 7 Drawing Sheets

250

Related U.S. Application Data continuation of application No. 17/872,051, filed on Jul. 25, 2022, now Pat. No. 12,028,424.

(56) References Cited

U.S. PATENT DOCUMENTS

| | | | |
|---|---|---|---|
| 2015/0082308 | A1 | 3/2015 | Kiess et al. |
| 2018/0316730 | A1 | 11/2018 | Schaefer et al. |
| 2018/0349195 | A1 | 12/2018 | El Khayat et al. |
| 2019/0052549 | A1 | 2/2019 | Duggal et al. |
| 2019/0272331 | A1 | 9/2019 | Gangadhar et al. |
| 2020/0213205 | A1 | 7/2020 | Savoor et al. |
| 2021/0081186 | A1 | 3/2021 | Trossen |
| 2022/0108092 | A1 | 4/2022 | Wan et al. |
| 2023/0081153 | A1* | 3/2023 | Boguslavsky ...... G06F 11/3476 717/174 |
| 2023/0254200 | A1 | 8/2023 | Rathinam et al. |
| 2024/0031444 | A1 | 1/2024 | Simon |
| 2024/0305694 | A1 | 9/2024 | Simon |

OTHER PUBLICATIONS

"https://docbox.etsi.org/ISG/N FV/Open/other/Tutorials/201810-Tutorials-SDN_N FV World_Congress-The_Haque/ETSI_N FV Layer123_SDN_N FV WC_2018_ VN FD_RX15002.pdf", 2018, 34 days.

* cited by examiner

100

WIRELESS ACCESS 120
122
124
124
126
MEDIA ACCESS 140
144
144
MEDIA TERMINAL 142
COMMUNICATIONS NETWORK 125
NE 154
NE 156
NE 150
NE 152
SWITCHING DEVICE 132
134
134
VOICE ACCESS 130
CONTENT SOURCES 175
ACCESS TERMINAL 112
BROADBAND ACCESS 110
114
114

250

300

600

CLOUD DEPLOYMENT OF NETWORK FUNCTION SOFTWARE WITH A MANAGEMENT MANIFEST

CROSS-REFERENCE TO RELATED APPLICATIONS

This application is a continuation of and claims priority to U.S. patent application Ser. No. 18/669,646 filed May 21, 2024, which is a continuation of and claims priority to U.S. patent application Ser. No. 17/872,051 filed Jul. 25, 2022 (now U.S. Pat. No. 12,028,424). All sections of the aforementioned application(s) and/or patent(s) are incorporated herein by reference in their entirety.

FIELD OF THE DISCLOSURE

The subject disclosure relates to cloud deployment of network function software with a management manifest.

BACKGROUND

In cloud computing, numerous server devices are connected to one another to enable centralized data processing and storage as well as access to network resources and services. Cloud computing can be implemented in a public, private, or hybrid manner depending on the data type and sensitivity involved. A public cloud provides data services over a publicly-accessible network. In contrast, a private cloud provides data services for a single organization, where access is permitted only to authorized users in the organization. A hybrid cloud is a combination of public and private clouds, where sensitive data that needs to be protected can be managed on the private cloud and other data can be hosted on the public cloud.

Data centers and communications network systems (i.e., radio access networks (RANs)) are increasingly leveraging cloud computing environments to address the high demands for data transfer and consumption. Managed cloud computing environments can be implemented in different ways. In a virtual machine (VM) implementation, a physical server (e.g., bare metal/cloud provider hardware) and/or an operating system thereof are abstracted using a hypervisor upon which one or more VMs (each including a guest operating system) may be instantiated. Virtualized network functions (VNFs) may be deployed in VM(s) of one or more physical servers. A containerized implementation has become more popular in recent years. In this implementation, a physical server and an operating system thereof are abstracted using one or more container runtime systems each corresponding to a server node. Each container runtime system may be controlled to instantiate one or more containers (each with a container runtime interface that interacts with the operating system via the container runtime system). In this implementation, containerized network functions (CNFs) may be deployed in container(s) of one or more server nodes.

BRIEF DESCRIPTION OF THE DRAWINGS

Reference will now be made to the accompanying drawings, which are not necessarily drawn to scale, and wherein.

DETAILED DESCRIPTION

Figure 1:
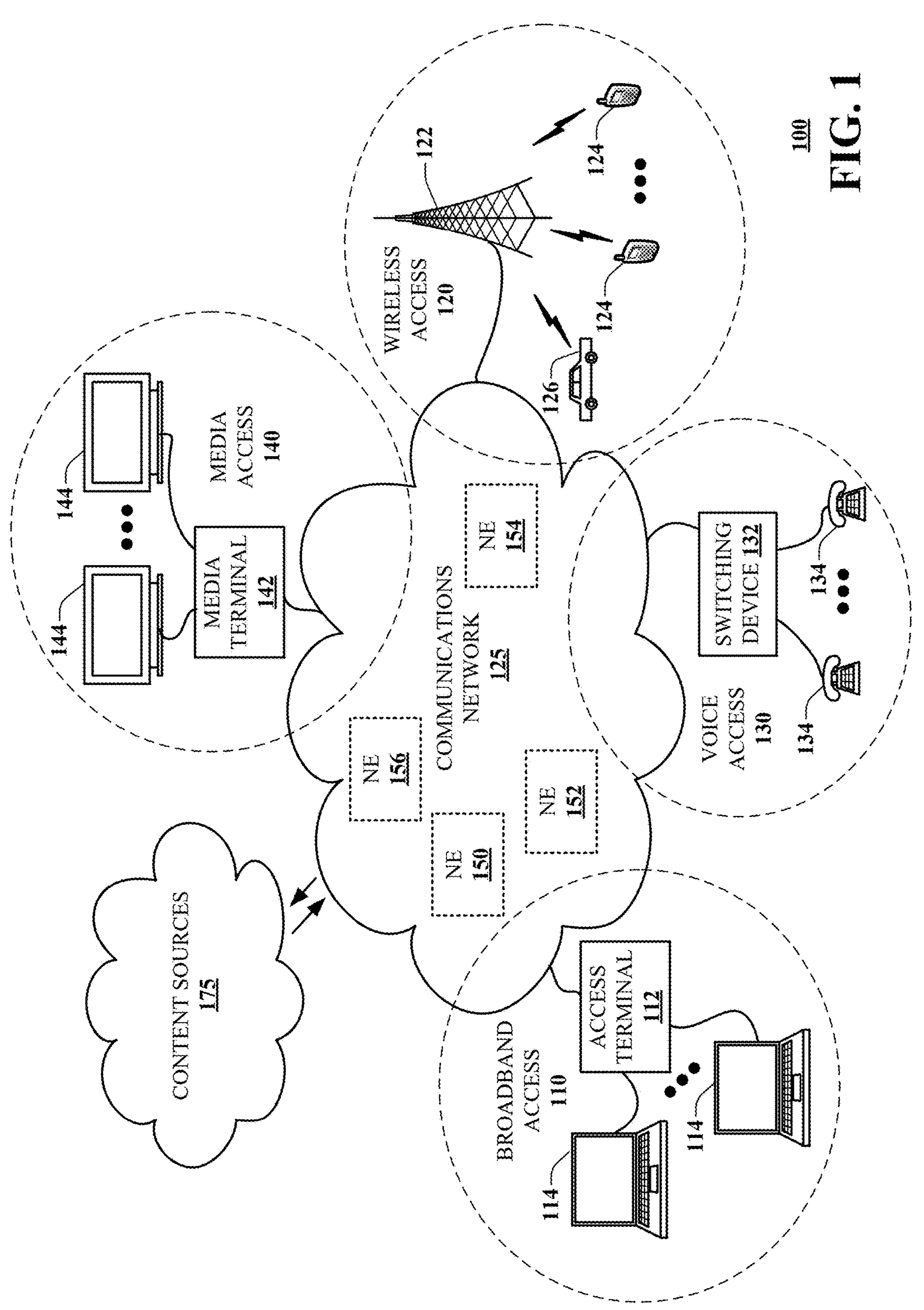
FIG. 1 is a block diagram illustrating an exemplary, non-limiting embodiment of a communications network in accordance with various aspects described herein.

Fault configuration and performance management of elements has become important in the evolution of software or managed solutions. The deployment of applications, such as network function (NF) applications, to provide cloud services is generally performed with an emphasis or focus on elasticity, flexibility, and portability. Presently, VNFs or CNFs can be rapidly deployed into managed cloud environments using large-scale hosting solutions. Each NF can be unique in scale, dimensioning, complexity, or technology generation.

Legacy systems have incorporated the usage of legacy management interfaces, such as those relating to Simple Network Management Protocol (SNMP), while newer systems utilize application programming interfaces (APIs) or data feeds of performance data. Due to the varying nature of each deployment, integration of these systems can be very complex, lengthy, and problematic, and can span multiple generations of technology. In particular, integrators typically have to interrogate the original platform design engineers or system builders prior to a given deployment, which can result in delayed time-to-market and negative impacts to the accuracy of elements being onboarded into the various application environments. While there exist templates for deploying software into cloud or hosting environments, deployable software packages are generally not standalone or self-contained and require additional integrator effort to characterize the Key Performance Indicators (KPIs) or Key Capacity Indicators (KCIs) for proper administration. That is, with software-based modularity where NFs are deployed into cloud instances, information regarding the attributes (e.g., interfaces, parameters/values, capacities, etc.) for "care and feeding" of the system is generally not portable with the system itself. Improper or inaccurate dimensioning after deployment can lead to service outages or even (e.g., Federal Communications Commission (FCC)) reportable events, as resources become exhausted, unmanaged, or unstable. Capacities of the system can also be impacted with each release, which can be exceptionally challenging to manage during upgrades across releases or deployments.

As an example, a communications network operated by a network provider may include core infrastructure elements, such as gateway devices or the like. In a clustered configuration, a gateway may serve, or equate to, a certain number of subscribers (e.g., one million customers). However, when NF software is deployed to provide the gateway configuration, the context of the overall expected capacity of the system and other important attributes are generally not provided to the integrator. Rather, prior to NF deployment into an ecosystem, the integrator must go "out of band," "out of system," "out of process," and/or "out of cycle" to identify all of this information (which can often take several weeks) so as to establish the necessary characteristics of lifecycle management of various elements before the NF can be integrated into the ecosystem. In fact, in certain software bundles (especially for a CNF to be deployed in a public cloud environment), there may be multiple interfaces, multiple managed capacities, multiple ways to interact with the system, and so on, all of which are important for an integrator to identify prior to deploying the system.

The subject disclosure describes, among other things, illustrative embodiments of a method for providing an NF software bundle or package that includes an NF software application to be deployed as well as a template—i.e., a technical management manifest file—for lifecycle management of the deployed system. In exemplary embodiments, the template includes a specification or definitions of attributes associated with the NF application and/or deployed system.

In various embodiments, the definitions may describe management interfaces associated with element(s) of the NF application and/or system. In one or more embodiments, the definitions may additionally, or alternatively, describe protocols associated with element(s) of the NF application and/or system. In certain embodiments, the definitions may additionally, or alternatively, describe KPIs, KCIs, and/or soft-alarming thresholds (along with warnings/severities) associated with operating conditions of the NF application and/or system. In one or more embodiments, the definitions may enumerate key data elements—e.g., the framework and associated capacities with the software platform itself—to allow for immediate incorporation into an Operations Support System (OSS) or Business Support System (BSS). For instance, upon deployment of an exemplary NF software package release into a cloud environment, an Element Management System (EMS) may retrieve the management manifest for the NF software platform to identify points of reachable interfaces (e.g., Internet Protocol (IP) address(es), port(s), method(s), etc.), attribute/value pairs, authentication information, capacities information, soft alarm thresholds, and so on, and may, according to these identified details, perform one or more actions to integrate the elements with the appropriate values associated with the NF release for overall lifecycle management.

In this way, the NF software package is provided as a standalone, self-contained entity that reduces or eliminates a need for external manual efforts that would otherwise be needed to accurately deploy the software. That is, the capability for fault polling, performance management, and/or the like is provided (e.g., near) immediately upon arrival or instantiation of the NF software.

In one or more embodiments, the bundling approach described herein allows for efficient adaptive management as different versions of the NF software are released, where updates to the software can be accompanied by any associated changes to system attributes (e.g., per manifest), such as the interfaces, ports, protocols, KPIs, KCIs, thresholds and alarms, etc.

In various embodiments, the NF package may be provided in an open or standards-based manner, which enables the software to be portable across different cloud environments (e.g., different public clouds), thereby allowing for efficient, automatic consumption or absorption of the relevant attributes for the software in any such environment.

Exemplary embodiments thus allow for software to be deployed and scaled with the potential for (e.g., near) immediate administration of deployed elements. That is, by accompanying software packages with a technical manifest for managing the deployed tenant applications, systems can be dynamically integrated, scaled, or sustained without feedback loops or lengthy integration periods. This conserves time and energy resources and thus allows for faster time-to-market. Applications, once instantiated in a private or public cloud instance, can be queried for their management manifest to allow for proper operations, administration, capacity management, and maintenance.

Self-contained software, with package versions, may also be cataloged, deployed, and managed. This allows for software to be authored and deployed with confidence as to the associated capacities for the elements themselves, which reduces or eliminates a need for reconciliation between software consumers and software authors to identify the appropriate approach to platform management, capacity, or dimensioning. Utilizing a manifest template to accompany software-based cloud deployments, as described herein, thus provides ease-of-deployment and facilitates efficient management for any hosted application.

Accurate management of system resources when deployed (based on an accurate understanding of expected capacities) also prevents catastrophic outages or user-impacting events. Resource utilization based on KPIs, KCIs, and/or the like also enables efficient network operations. In summary, as software generally cannot be reliably put into service until it can be accurately managed, providing a management manifest with a software package, as described herein, allows for quick and efficient resource utilization that is believed to be otherwise virtually impossible with conventional software deployments.

One or more aspects of the subject disclosure include a device, comprising at least one processor, and a memory that stores executable instructions that, when executed by the at least one processor, facilitate performance of operations. The operations can include generating a management manifest for a network function (NF) software application, wherein the NF software application is to be deployed in a cloud computing environment. Further, the operations can include, based on the generating the management manifest, deriving a software package that includes the NF software application and the management manifest. Further, the operations can include causing the software package to be outputted for deployment in the cloud computing environment, wherein inclusion of the management manifest with the NF software application in the software package facilitates utilization of the management manifest for monitoring and management of a system that results from deployment of the NF software application in the cloud computing environment.

One or more aspects of the subject disclosure include a non-transitory machine-readable medium, comprising executable instructions that, when executed by at least one processor, facilitate performance of operations. The operations can include receiving a software package that includes a network function (NF) software application and a management manifest associated with the NF software application, wherein the management manifest identifies attributes associated with a system that results from deployment of the NF software application in a cloud environment. Further, the operations can include, responsive to the receiving the software package, analyzing the attributes identified in the management manifest for particular attributes of interest. Further, the operations can include, based on the analyzing the attributes, utilizing the particular attributes of interest in one or more management systems to facilitate management of a lifecycle of the NF software application.

One or more aspects of the subject disclosure include a method. The method can comprise deriving, using at least one processor, a management manifest for a network function (NF) software application, wherein the NF software application is to be deployed in one or more cloud computing environments. Further, the method can include generating, using the at least one processor, a software bundle that includes both the NF software application and the management manifest. Further, the method can include providing, using the at least one processor, the software bundle for deployment in the one or more cloud computing environments, wherein inclusion of the management manifest with the NF software application in the software bundle facilitates utilization of the management manifest for monitoring and management of a system that results from the deployment of the NF software application in the one or more cloud computing environments.

Other embodiments are described in the subject disclosure.

Referring now to FIG. 1, a block diagram is shown illustrating an example, non-limiting embodiment of a system 100 in accordance with various aspects described herein. For example, system 100 can facilitate, in whole or in part, providing of an NF software bundle or package that includes an NF software application to be deployed as well as a template—i.e., a technical management manifest file—for lifecycle management of the deployed system, where the template includes a specification or definitions of attributes associated with the NF application and/or deployed system. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communications network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VOIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or another communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
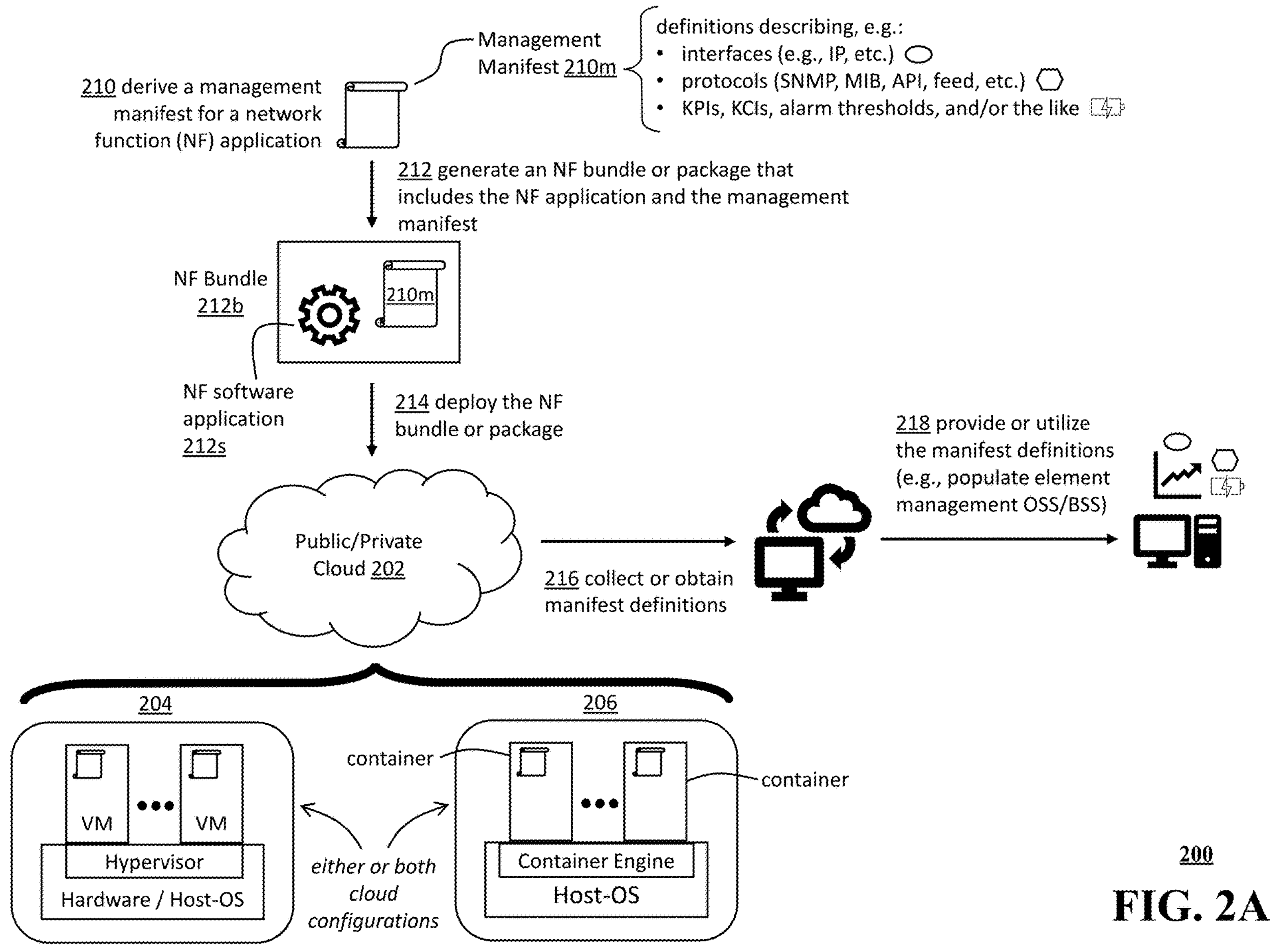
FIG. 2A is a block diagram illustrating an example, non-limiting embodiment of a system functioning within, or operatively overlaid upon, the communications network of FIG. 1 in accordance with various aspects described herein.

FIG. 2A is a block diagram illustrating an example, non-limiting embodiment of a system 200 functioning within, or operatively overlaid upon, the communications network 100 of FIG. 1 in accordance with various aspects described herein.

As shown in FIG. 2A, the system 200 may include a public/private cloud 202. In various embodiments, a portion or an entirety of the cloud 202 may be configured in a VM implementation 204 and/or in a containerized implementation 206. In the VM implementation 204, a physical server (e.g., bare metal/cloud provider hardware) and/or an operating system thereof may be abstracted using a hypervisor upon which one or more VMs (each including a guest operating system) may be instantiated. In the containerized implementation 206, a physical server and an operating system thereof may be abstracted using one or more container runtime systems each corresponding to a server node. Each container runtime system may be controlled to instantiate one or more containers (each with a container runtime interface that interacts with the operating system via the container runtime system).

As shown by reference number 210, a management manifest 210*m* for an NF software application 212*s* may be derived. In exemplary embodiments, the management manifest 210*m* may be a template file (e.g., a data structure file)

that specifies or provides definitions that describe attributes (or informational elements) associated with the NF application 212*s*.

In one or more embodiments, the management manifest 210*m* may be manually generated. For instance, a developer of the NF software application 212*s* may manually specify the various attributes associated with the application and provide descriptions for the informational elements in the management manifest 210*m*. As an example, for a containerized implementation of a cloud environment (described in more detail below), where a developer of a CNF software application 212*s* may create a script of instructions for generating a container image, the developer may define the management manifest specification 210*m* along with the instructions for the creation of the container image (e.g., whether embedded within the same script of instructions or defined in one or more other files separate from the script).

In various embodiments, the management manifest 210*m* may be automatically generated—e.g., using a machine learning (ML) model that is trained to identify the informational elements associated with the NF application 212*s* and generate descriptions for the informational elements in the management manifest 210*m*.

In exemplary embodiments, the management manifest 210*m* may describe management interfaces associated with element(s) of the NF application 212*s* and/or associated with a system that results from deployment of the NF application 212*s*. For example, the management manifest 210*m* may define one or more IP interfaces and/or IP addresses that can be used or accessed to communicate with managed element(s) of the NF application 212*s* and/or nodes of a cluster associated with the NF application 212*s* when the NF application 212*s* is deployed in a cloud environment, such as the cloud 202. For instance, the management manifest 210*m* may specify five interfaces that can be used to obtain information regarding expected capacities and/or management of the deployed system.

In certain embodiments, the management manifest 210*m* may additionally, or alternatively, describe protocol(s) that can be used to query the interfaces associated with managed element(s) of the NF application 212*s*/the deployed system, communicate with nodes of a cluster associated with the NF application 212*s*/the deployed system, and/or the like. For example, the protocol(s) may include SNMP, management information base (MIB), API (including the particular API feed(s)), one or more other protocols (e.g., legacy protocol(s)), event buses or feeds, and so on.

In this way, the management manifest 210*m* may provide programmable instructions on how to retrieve information from the cluster or managed element(s).

In various embodiments, the management manifest 210*m* may additionally, or alternatively, describe KPIs, KCIs, soft-alarming thresholds (along with warnings/severities), and/or the like associated with the NF application 212*s* and/or the deployed system. KPIs may facilitate measurement of network performance, and thus aid in troubleshooting of network degradation and outages, determining of root causes of latency (e.g., packet loss, saturation, bandwidth bottlenecks, interface outages, device outages, etc.), and so on. In certain embodiments, KPIs may relate to device health (e.g., central processing unit (CPU) utilization and/or temperature, memory utilization, fan status, etc.), device availability (e.g., in real-time or near real-time), latency and/or packet loss, volume of network traffic, errors and discards per interface (e.g., inbound and/or outbound), and/or the like. Having access to such critical performance data in a network operations center (NOC) or single "pane of glass" can be key to identifying and resolving network issues as soon as they arise. In one or more embodiments, KCIs may relate to load on a system and/or system element, such as expected transaction capacity. In various embodiments, KCIs may additionally, or alternatively, include Transactions Per Second (TPS), Fill Capacity (e.g., total number of available entries), and/or other defined values for the system itself, such as minimum number of peers, redundancy state values, etc. Such items may be critical to the operational administration of a given system.

In various embodiments, the management manifest 210*m* may additionally, or alternatively, specify values for thresholds/alarms (e.g., Threshold Crossing Alarm (TCA) values and severities) associated with KCIs and/or KPIs. As there can be numerous (e.g., thousands of) KPIs and/or KCIs that can be monitored when the NF software 212*s* is deployed, providing the appropriate thresholds/alarms associated with such KPIs and/or KCIs can be crucial for system management. For instance, one or more thresholds can be utilized to identify a need to perform traffic steering away from certain devices or nodes.

In some embodiments, color indicators can be utilized to represent different threshold-satisfying scenarios. As an example, for a given KCI, a certain color indicator (e.g., green) may be associated with a particular level of resource utilization (e.g., 0% to 70%), a different color indicator (e.g., amber) may be associated with a higher level of resource utilization (e.g., 70% to 90%), and yet another color indicator (e.g., red) may be associated with a maximum level of resource utilization (e.g., 90% or higher) that can result in customer/system impacts. In any case, exposing KPIs and KCIs and associated thresholds in the management manifest 210*m* allows for more efficient proactive management of the deployed system and more uniform resource consumption.

In one or more embodiments, the management manifest 210*m* may additionally, or alternatively, enumerate key data elements—e.g., the framework and associated capacities with the software platform itself—to allow for immediate incorporation into an OSS or BSS. In essence, the management manifest 210*m* may identify interface(s), protocol(s), and/or port(s), where such information may be incorporated into a management platform to use for polling, fault correlation, and/or management of the deployed system.

As shown by reference number 212, an NF bundle or package 212*b* that includes the NF application 212*s* and the management manifest 210*m* may be generated, and as shown by reference number 214, the NF bundle or package 212*b* may be deployed. In exemplary embodiments, the management manifest 210*m* may be implemented using a standards-based approach such that it is agnostic to the type of cloud environment in which the associated NF application is deployed. That is, the management manifest 210*m* may be generic, and can be run or consumed in either or both of the cloud implementations 204 and 206, which allows for flexible deployment in heterogeneous environments. For instance, the management manifest 210*m* may be run or consumed by one or more hypervisors of the VM implementation 204, where the NF application 212*s* is deployed (e.g., using a heat template or the like) in a VM or a cluster of VMs. Additionally, or alternatively, the management manifest 210*m* may be bundled for the containerized implementation 206, where the NF application 212*s* is employed in container(s) within PODs. In either case, inclusion of the management manifest 210*m* within the NF package 212*b* enables publishing of the management manifest 210*m* (e.g., upon deployment of the NF application 212*s*), which can reflect what it is that is being deployed as the software product (i.e., the various attributes of the resources that are being instantiated for the NF application 212*s*), thereby enabling incremental management and/or absorption by the management entity.

As shown by reference number 216, manifest definitions may be collected or obtained, and as shown by reference number 218, the manifest definitions may be utilized (e.g., for lifecycle management of the NF application 212*s*). In exemplary embodiments, depending on the system management needs, values of certain defined attributes in the management manifest 210*m* may be extracted. For instance, interfaces of nodes of the system, ports of nodes of the system, protocols associated with the interfaces/ports, etc. (including interfaces/ports/protocols usable to retrieve information for KCIs/KPIs of interest) may be obtained from the management manifest 210*m*.

As an example of the above-described process, an NF application for a gateway server in a core network may be bundled with a management manifest. Here, the NF application may be configured to be deployed across a twelve node cluster—e.g., ten VMs for packet forwarding purposes and two VMs for management purposes. Continuing the example, the management manifest may specify one or more attributes associated with the VMs. For instance, the management manifest may identify the ten packet forwarding VMs and the two management VMs. Continuing the example, the management manifest may describe how each of the two management VMs may be queried for certain data (e.g., via Restful APIs and/or ports), describe one or more thresholds associated with transactional capacities of each of the two management VMs, specify expected concurrent managed sessions for each of the two management VMs (e.g., each VM may be capable of handling 100,000 concurrent managed subscriber sessions), and/or the like. Further continuing the example, the management manifest may identify various packet-related management characteristics (e.g., packet data rates, average packet size, memory utilization, etc.) for each of the ten packet forwarding VMs, value ranges for capacity (e.g., expected capacity for normal operations, peak utilization, etc.), associated alarm thresholds, and/or the like. Still continuing the example, the management manifest may describe how each of the ten packet forwarding VMs may be queried for certain data (e.g., specific protocol(s) on specific port(s) on certain IP addresses associated with the VMs that are established upon deployment of the NF application in the cloud environment). As part of deployment of the NF application bundle, the management manifest may be downloaded/accessed. For instance, an automated system or an administrator may retrieve the management manifest from the NF application bundle, identify components or elements of the NF application that are to be managed, identify values or ranges of the components or elements to be managed, and configure an NOC to access, monitor, and manage the deployed system as needed. As an example, by ascertaining that each of the ten packet forwarding VMs has a certain expected transactional capacity, the automated system or administrator may notify particular northbound system(s) as to these expected capacities to facilitate uniform loading.

In this way, management of the system can occur near instantaneously via a single pane of glass upon deployment of the NF application, thereby reducing or eliminating a need for an otherwise time-consuming out of band or out of cycle process before the NF application can be integrated into the network ecosystem.

In one or more embodiments, the above-described bundling approach allows for efficient adaptive management as different versions of the NF application are released. For instance, a developer of the NF application may update the software (to patch issues, for optimizations, etc.) and update the associated management manifest with appropriate changes to system attributes, such as the interfaces, ports, protocols, KPIs, KCIs, thresholds and alarms, and/or the like associated with the system. Here, an updated software package/bundle can be generated and deployed in a cloud computing environment, where the updated management manifest may be published and changes/updates therein can be dynamically identified (e.g., via a comparison of the management manifest attributes/values in a prior bundle with the attributes/values in the updated bundle) and utilized for subsequent management of the updated system. This advantageously avoids misses in alignment of certain indicators of interest (e.g., expected capacities of VMs or nodes) and reduces or eliminates any need for manual reverse engineering to identify changes to such indicators.

In various embodiments, the NF package may be provided in an open or standards-based manner, which enables the software to be portable across different cloud environments or different types of cloud environments, allowing for efficient, automatic consumption or absorption of the relevant attributes for the software in any such environment.

It is to be understood and appreciated that the quantity and arrangement of manifests, applications, bundles, cloud environments, VMs, hypervisors, hardware, operating systems, containers, and/or container engines shown in FIG. 2A are provided as an example. In practice, there may be additional manifests, applications, bundles, cloud environments, VMs, hypervisors, hardware, operating systems, containers, and/or container engines, different manifests, applications, bundles, cloud environments, VMs, hypervisors, hardware, operating systems, containers, and/or container engines, or differently arranged manifests, applications, bundles, cloud environments, VMs, hypervisors, hardware, operating systems, containers, and/or container engines than those shown in FIG. 2A. For example, the system 200 can include more or fewer manifests, applications, bundles, cloud environments, VMs, hypervisors, hardware, operating systems, containers, and/or container engines, etc. In practice, therefore, there can be hundreds, thousands, millions, billions, etc. of such manifests, applications, bundles, cloud environments, VMs, hypervisors, hardware, operating systems, containers, and/or container engines. In this way, example system 200 can coordinate, or operate in conjunction with, a set of manifests, applications, bundles, cloud environments, VMs, hypervisors, hardware, operating systems, containers, and/or container engines and/or operate on data sets that cannot be managed manually or objectively by a human actor. Furthermore, two or more manifests, applications, bundles, cloud environments, VMs, hypervisors, hardware, operating systems, containers, or container engines shown in FIG. 2A may be implemented within a single manifest, application, bundle, cloud environment, VM, hypervisor, hardware, operating system, container, or container engine, or a single manifest, application, bundle, cloud environment, VM, hypervisor, hardware, operating system, container, or container engine shown in FIG. 2A may be implemented as multiple manifests, applications, bundles, cloud environments, VMs, hypervisors, hardware, operating systems, containers, or container engines. Additionally, or alternatively, a set of manifests, applications, bundles, cloud environments, VMs, hypervisors, hardware, operating systems, containers, or container engines of the system 200 may perform one or more functions described as being performed by another set of manifests, applications, bundles, cloud environments, VMs, hypervisors, hardware, operating systems, containers, or container engines of the system 200.

It is also to be understood and appreciated that, although FIG. 2A is described above as pertaining to various processes and/or actions that are performed in a particular order, some of these processes and/or actions may occur in different orders and/or concurrently with other processes and/or actions from what is depicted and described above. Moreover, not all of these processes and/or actions may be required to implement the systems and/or methods described herein.

Further, in various embodiments, threshold(s) may be utilized as part of determining/identifying one or more actions to be taken or engaged. The threshold(s) may be adaptive based on an occurrence of one or more events or satisfaction of one or more conditions (or, analogously, in an absence of an occurrence of one or more events or in an absence of satisfaction of one or more conditions).

Additionally, the above-described use of ML algorithm(s) for generating a management manifest may be implemented as follows. For instance, in some embodiments, a computing device (e.g., in system 200) may use one or more ML algorithms configured to learn how to generate a management manifest. As an example, in certain embodiments, the computing device may provide information regarding one or more management manifests as input to one or more ML algorithms, which may perform ML learning to automate future generations of management manifests. Here, the computing device may train a ML algorithm based on: known inputs (e.g., particular portions of code of an NF software application) and known outputs (e.g., corresponding interfaces (or types of interfaces), communication protocols, ports, KPIs, KCIs, alarms/thresholds, etc.). In some embodiments, the computing device may refine an ML algorithm based on feedback received from a user of the computing device and/or from one or more other devices (e.g., management device(s)). For example, the user of the computing device and/or one or more management devices may provide feedback indicating whether generations of management manifests, made by the ML algorithm based on new inputs, are accurate and/or helpful. When the feedback indicates that a particular generation is accurate and/or helpful, the computing device may configure the ML algorithm to make generations of management manifests based on the particular generation (e.g., to generate management manifests in a manner similar to that in which the particular generation was made). When the feedback indicates that a particular generation is not accurate or helpful, the computing device may configure the ML algorithm to avoid generating management manifests in a manner in which the particular generation was made. In this way, the computing device can generate management manifests based on an ML algorithm, which improves the accuracy of the generations, and conserves processor and/or storage resources that may otherwise be used to generate and store rules for generating management manifests.

In certain embodiments, utilization of information extracted from a management manifest may similarly be performed by one or more ML algorithms. Here, for instance, the known inputs may include particular interfaces (or types of interfaces), communication protocols, ports, KPIs, KCIs, alarms/thresholds, etc., and the known outputs may include particular settings in a management system or interface (e.g., a NOC), particular data graphs to generate, particular statistics to track and aggregate, and so on.

In any case, the AI or ML algorithm(s) may be configured to reduce any error in the generations of management manifests and/or the utilization of information extracted from management manifests. In this way, any error that may be present may be provided as feedback to the algorithm(s), such that the error may tend to converge toward zero as the algorithm(s) are utilized more and more.

Figure 2B:
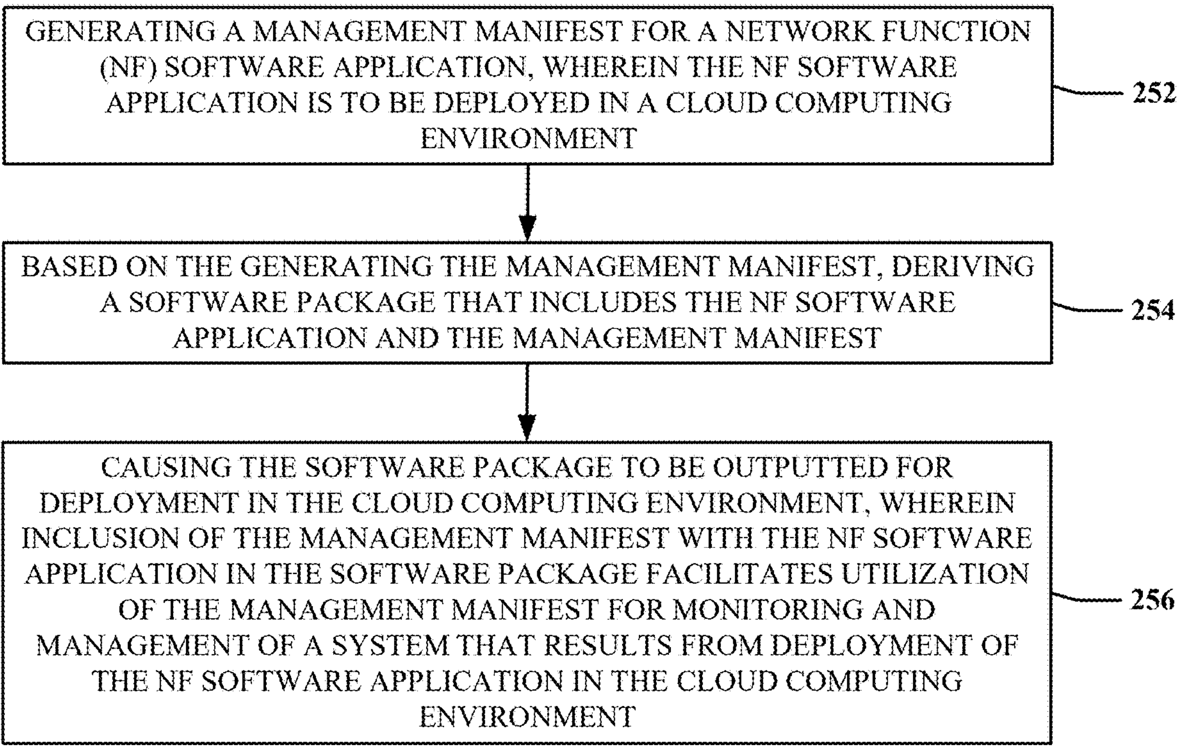
FIG. 2B depicts an illustrative embodiment of a method in accordance with various aspects described herein.

FIG. 2B depicts an illustrative embodiment of a method 250 in accordance with various aspects described herein. In some embodiments, one or more process blocks of FIG. 2B can be performed by one or more systems or devices, such as one or more systems or devices of the system 200.

At 252, the method can include generating a management manifest for a network function (NF) software application, wherein the NF software application is to be deployed in a cloud computing environment. For example, one or more systems or devices can, similar to that described above with respect to the system 200 of FIG. 2A, perform one or more operations that include generating a management manifest for a network function (NF) software application, wherein the NF software application is to be deployed in a cloud computing environment.

At 254, the method can include, based on the generating the management manifest, deriving a software package that includes the NF software application and the management manifest. For example, the one or more systems or devices can, similar to that described above with respect to the system 200 of FIG. 2A, perform one or more operations that include, based on the generating the management manifest, deriving a software package that includes the NF software application and the management manifest.

At 256, the method can include causing the software package to be outputted for deployment in the cloud computing environment, wherein inclusion of the management manifest with the NF software application in the software package facilitates utilization of the management manifest for monitoring and management of a system that results from deployment of the NF software application in the cloud computing environment. For example, the one or more systems or devices can, similar to that described above with respect to the system 200 of FIG. 2A, perform one or more operations that include causing the software package to be outputted for deployment in the cloud computing environment, wherein inclusion of the management manifest with the NF software application in the software package facilitates utilization of the management manifest for monitoring and management of a system that results from deployment of the NF software application in the cloud computing environment.

In some implementations of these embodiments, the management manifest comprises a data structure file that specifies attributes associated with the system. In some implementations of these embodiments, the attributes relate to one or more interfaces associated with one or more elements of the system. In some implementations of these embodiments, the attributes relate to one or more protocols useable to communicate over the one or more interfaces. In some implementations of these embodiments, the attributes relate to one or more key performance indicators (KPIs) associated with one or more elements of the system. In some implementations of these embodiments, the attributes relate to one or more key capacity indicators (KCIs) associated with one or more elements of the system. In some implementations of these embodiments, the attributes relate to thresholds and alarms associated with operating conditions of one or more elements of the system.

In some implementations of these embodiments, the management manifest is agnostic to a type of the cloud computing environment. In some implementations of these embodiments, the cloud computing environment is implemented based on virtual machines and one or more hypervisors, wherein the NF software application provides a virtual network function (VNF). In some implementations of these embodiments, the cloud computing environment is implemented based on containers and one or more container runtime systems, wherein the NF software application provides a containerized network function (CNF).

While for purposes of simplicity of explanation, the respective processes are shown and described as a series of blocks in FIG. 2B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
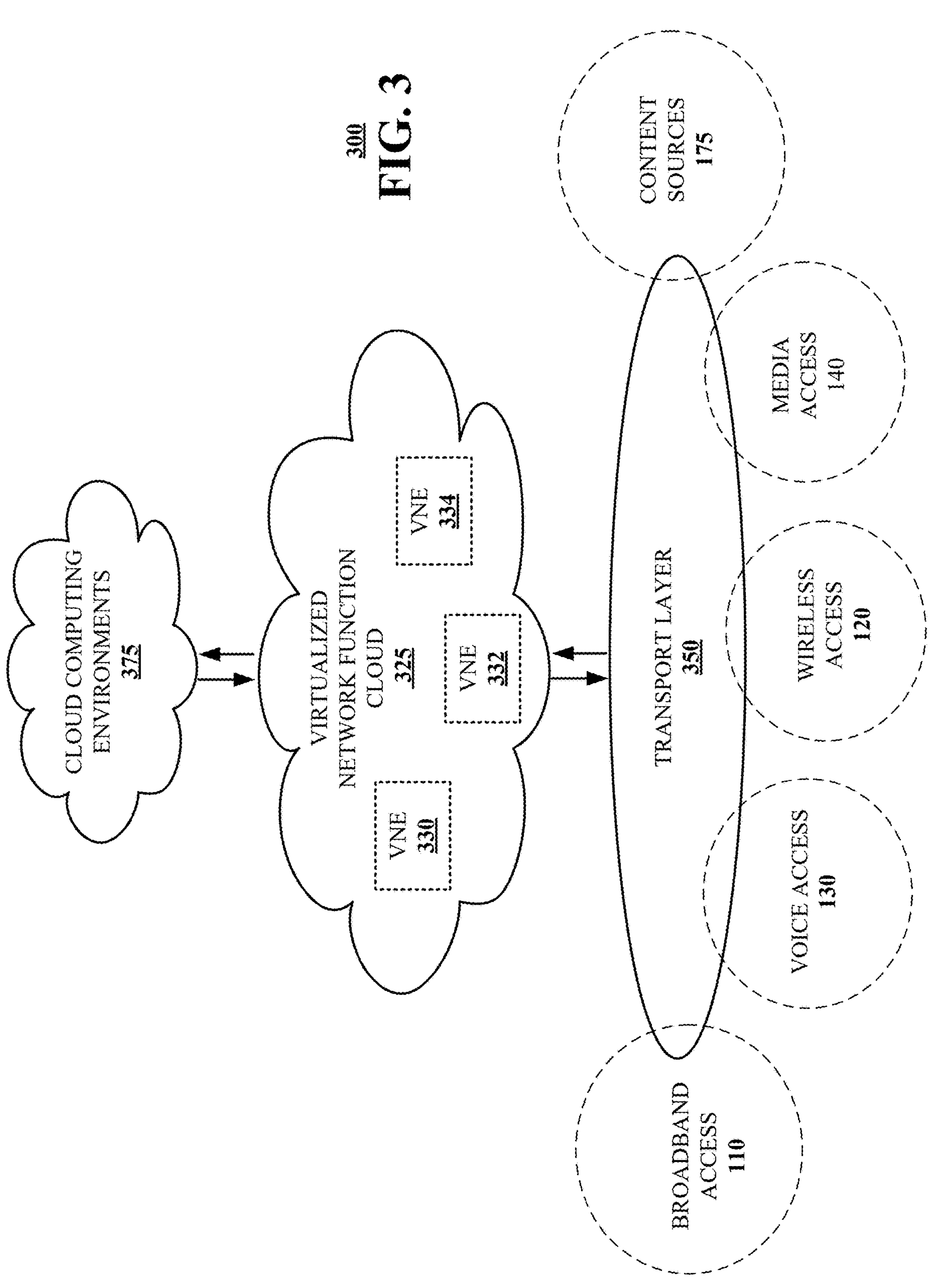
FIG. 3 is a block diagram illustrating an example, non-limiting embodiment of a virtualized communications network in accordance with various aspects described herein.

Referring now to FIG. 3, a block diagram 300 is shown illustrating an example, non-limiting embodiment of a virtualized communications network in accordance with various aspects described herein. In particular, a virtualized communications network is presented that can be used to implement some or all of the subsystems and functions of system 100, the subsystems and functions of system 200, and method 250 presented in FIGS. 1, 2A, and 2B. For example, virtualized communications network 300 can facilitate, in whole or in part, providing of an NF software bundle or package that includes an NF software application to be deployed as well as a template—i.e., a technical management manifest file—for lifecycle management of the deployed system, where the template includes a specification or definitions of attributes associated with the NF application and/or deployed system.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communications network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward substantial amounts of traffic, their workload can be distributed across a number of servers—each of which adds a portion of the capability, and which creates an overall elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
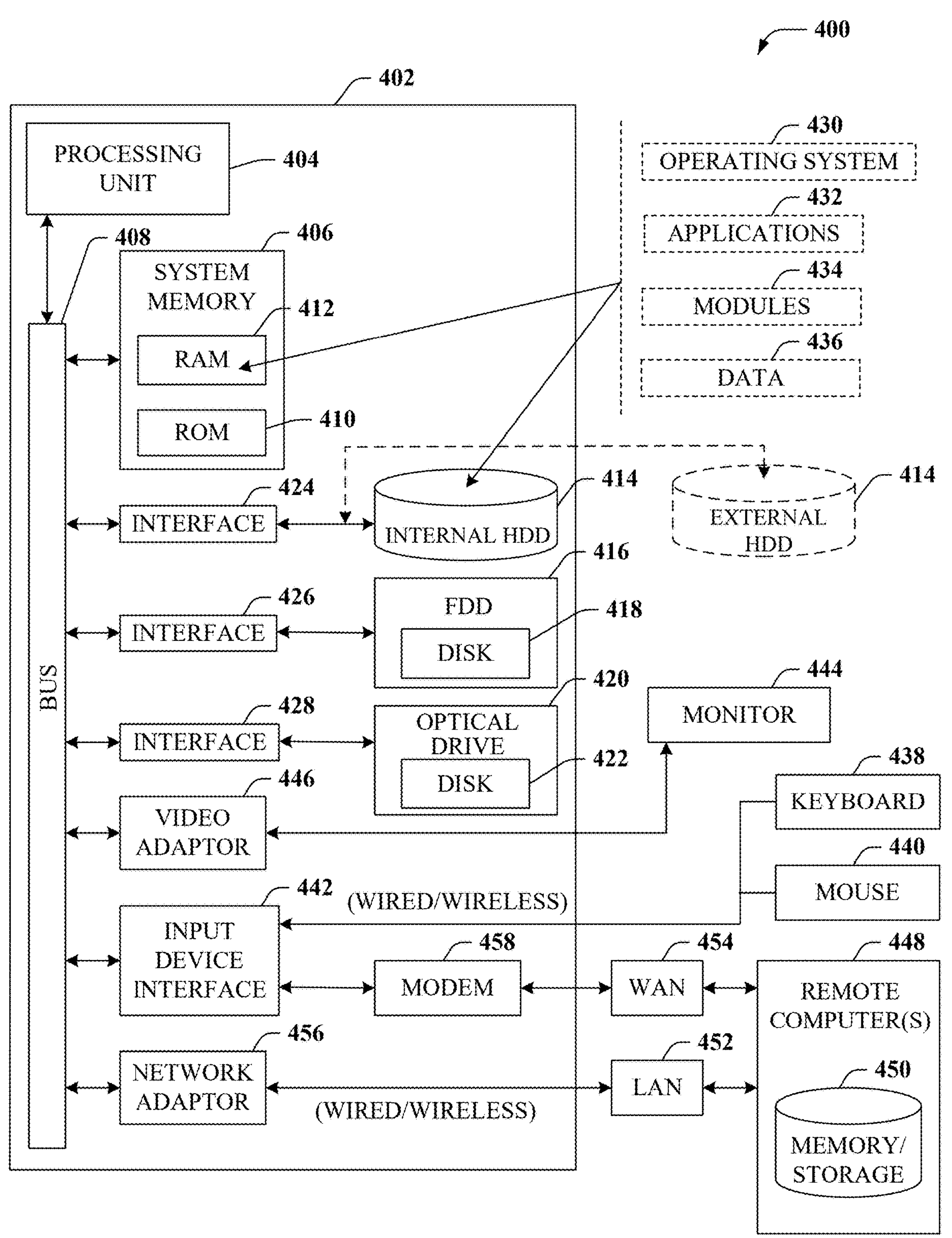
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate, in whole or in part, providing of an NF software bundle or package that includes an NF software application to be deployed as well as a template—i.e., a technical management manifest file—for lifecycle management of the deployed system, where the template includes a specification or definitions of attributes associated with the NF application and/or deployed system.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communications network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
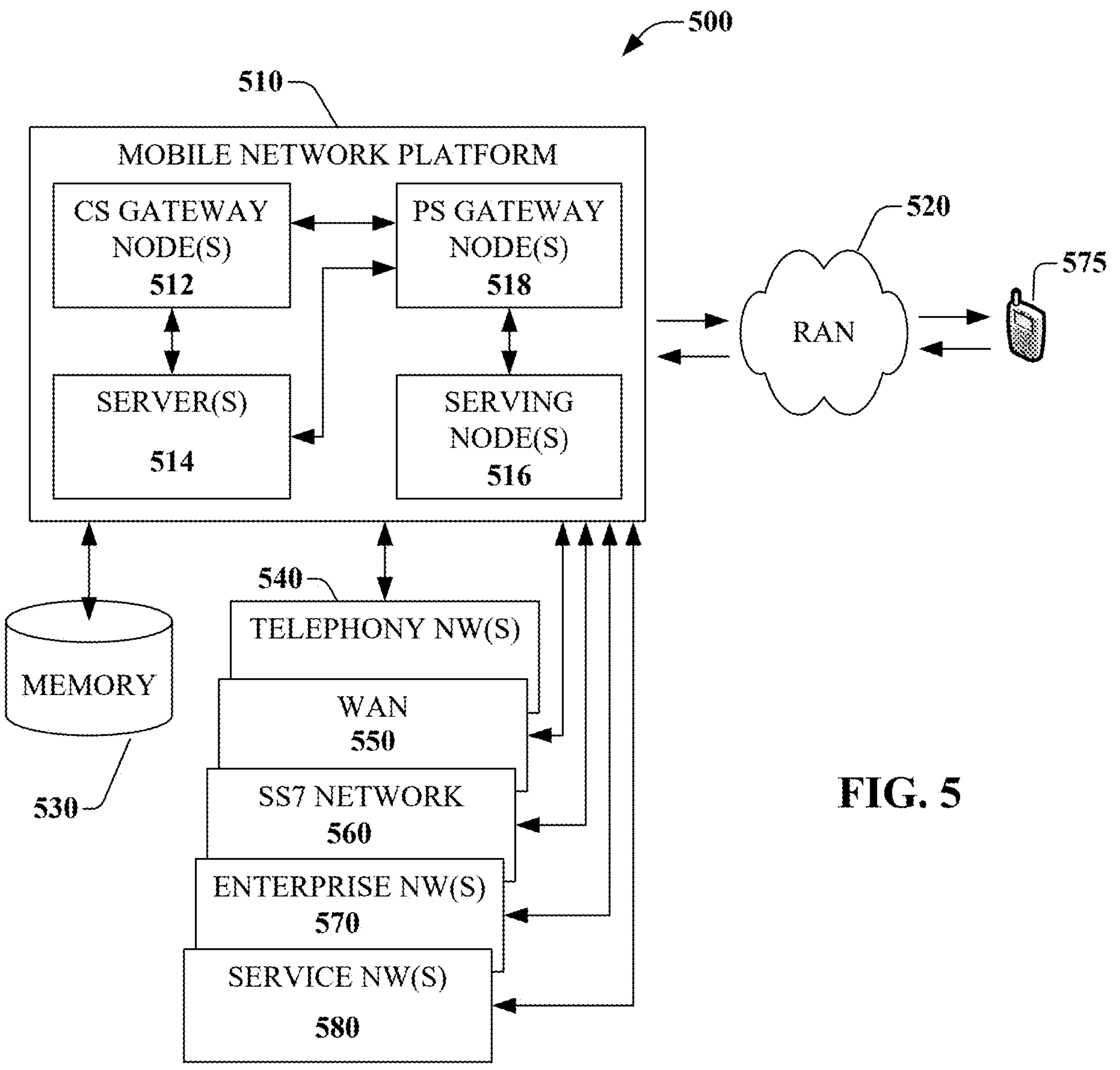
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate, in whole or in part, providing of an NF software bundle or package that includes an NF software application to be deployed as well as a template—i.e., a technical management manifest file—for lifecycle management of the deployed system, where the template includes a specification or definitions of attributes associated with the NF application and/or deployed system. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, which facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as distributed antenna networks that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
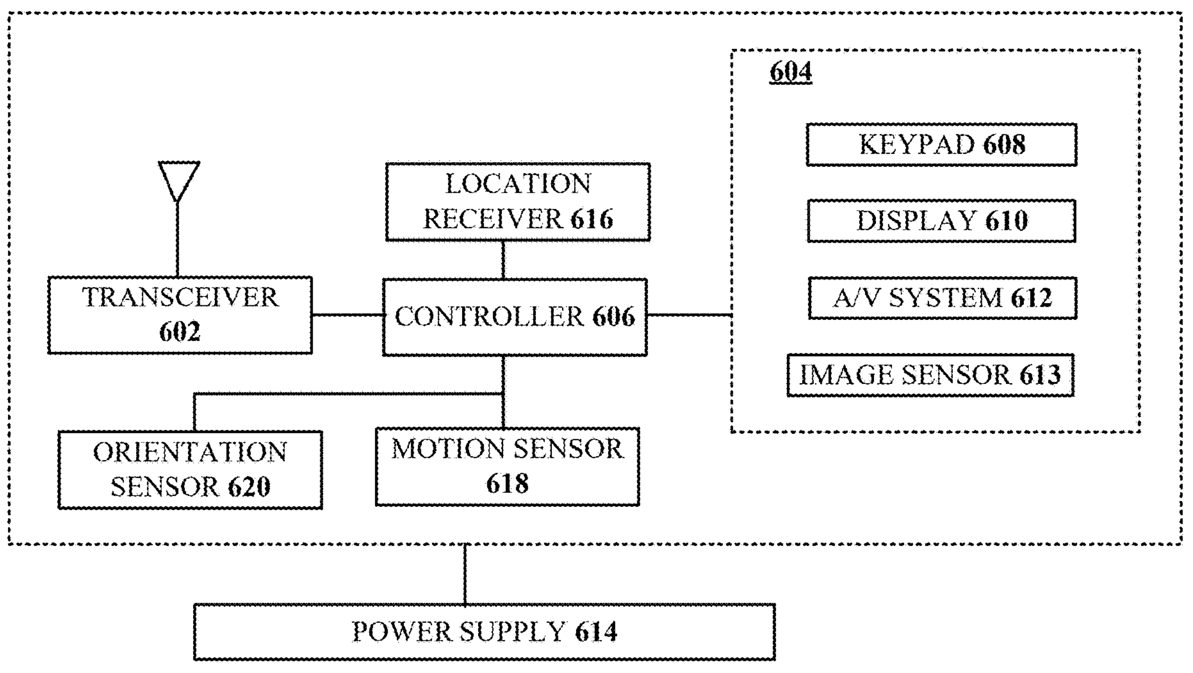
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via communications network 125. For example, computing device 600 can facilitate, in whole or in part, providing of an NF software bundle or package that includes an NF software application to be deployed as well as a template—i.e., a technical management manifest file—for lifecycle management of the deployed system, where the template includes a specification or definitions of attributes associated with the NF application and/or deployed system.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communications network) can employ various AI-based schemes for conducting various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x)=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communications network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to," "coupled to," and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:

at least one processor; and a memory that stores executable instructions that, when executed by the at least one processor, facilitate performance of operations, the operations comprising:

deriving a software package that includes a network function (NF) software application and a management manifest; and causing the software package to be outputted for deployment in a cloud computing environment, wherein inclusion of the management manifest with the NF software application in the software package facilitates utilization of the management manifest for management of a system that results from deployment of the NF software application in the cloud computing environment, and wherein the management manifest specifies authentication information that is usable to obtain information regarding expected capacities of the system.

2. The device of claim 1, wherein the management manifest comprises a data structure file that specifies attributes associated with the system.

3. The device of claim 2, wherein the attributes relate to one or more interfaces, and wherein the one or more interfaces are associated with one or more elements of the system.

4. The device of claim 3, wherein the attributes relate to one or more protocols useable to communicate over the one or more interfaces.

5. The device of claim 2, wherein the attributes relate to a plurality of key performance indicators (KPIs) associated with one or more elements of the system.

6. The device of claim 2, wherein the attributes relate to a plurality of key capacity indicators (KCIs) associated with one or more elements of the system.

7. The device of claim 2, wherein the attributes relate to thresholds and alarms associated with operating conditions of one or more elements of the system.

8. The device of claim 1, wherein the management manifest is agnostic to a type of the cloud computing environment.

9. The device of claim 1, wherein the cloud computing environment is implemented based on virtual machines and one or more hypervisors, and wherein the NF software application provides a virtual network function (VNF).

10. The device of claim 1, wherein the cloud computing environment is implemented based on containers and one or more container runtime systems, and wherein the NF software application provides a containerized network function (CNF).

11. A non-transitory machine-readable medium, comprising executable instructions that, when executed by at least one processor, facilitate performance of operations, the operations comprising:

receiving a software package that includes a network function (NF) software application and a management manifest associated with the NF software application, wherein the management manifest identifies attributes associated with a system that results from deployment of the NF software application in a cloud environment;

responsive to the receiving the software package, analyzing the attributes identified in the management manifest for particular attributes of interest; and based on the analyzing the attributes, utilizing the particular attributes of interest in one or more management systems to facilitate management of a lifecycle of the NF software application, wherein the particular attributes of interest relate to authentication information that is usable to obtain information regarding expected capacities of the system.

12. The non-transitory machine-readable medium of claim 11, wherein the attributes relate to thresholds and alarms associated with operating conditions of one or more elements of the system.

13. The non-transitory machine-readable medium of claim 11, wherein the operations further comprise deploying the NF software application in the cloud environment.

14. The non-transitory machine-readable medium of claim 11, wherein the cloud environment is implemented based on virtual machines and one or more hypervisors, and wherein the NF software application provides a virtual network function (VNF).

15. The non-transitory machine-readable medium of claim 11, wherein the cloud environment is implemented based on containers and one or more container runtime systems, and wherein the NF software application provides a containerized network function (CNF).

16. A method, comprising:

generating, using at least one processor, a software bundle that includes both a network function (NF) software application and a management manifest; and providing, using the at least one processor, the software bundle for deployment in one or more cloud computing environments, wherein inclusion of the management manifest with the NF software application in the software bundle facilitates utilization of the management manifest for management of a system that results from the deployment of the NF software application in the one or more cloud computing environments, and wherein the management manifest specifies authentication information that is usable to obtain information regarding expected capacities of the system.

17. The method of claim 16, wherein the NF software application relates to packet forwarding.

18. The method of claim 16, wherein the one or more cloud computing environments are implemented based on virtual machines and one or more hypervisors, and wherein the NF software application provides a virtual network function (VNF).

19. The method of claim 16, wherein the one or more cloud computing environments are implemented based on containers and one or more container runtime systems, and wherein the NF software application provides a containerized network function (CNF).

20. The method of claim 16, wherein the management manifest comprises a template that specifies attributes useful for managing the system.

* * * * *